May 25, 1954 L. S. BENSKY ET AL 2,679,638

COMPUTER SYSTEM

Filed Nov. 26, 1952

2 Sheets-Sheet 1

INVENTORS
LOWELL S. BENSKY
& ARTHUR D. BEARD
BY Morris Lebkin
ATTORNEY

INVENTORS
LOWELL S. BENSKY &
ARTHUR D. BEARD
BY Marcial Rabbin
ATTORNEY

Patented May 25, 1954

2,679,638

UNITED STATES PATENT OFFICE 2,679,638

COMPUTER SYSTEM

Lowell S. Bensky and Arthur D. Beard, Haddonfield, N. J., assignors to Radio Corporation of America, a corporation of Delaware Application November 26, 1952, Serial No. 322,762

7 Claims. (Cl. 340—174)

Figure 1:
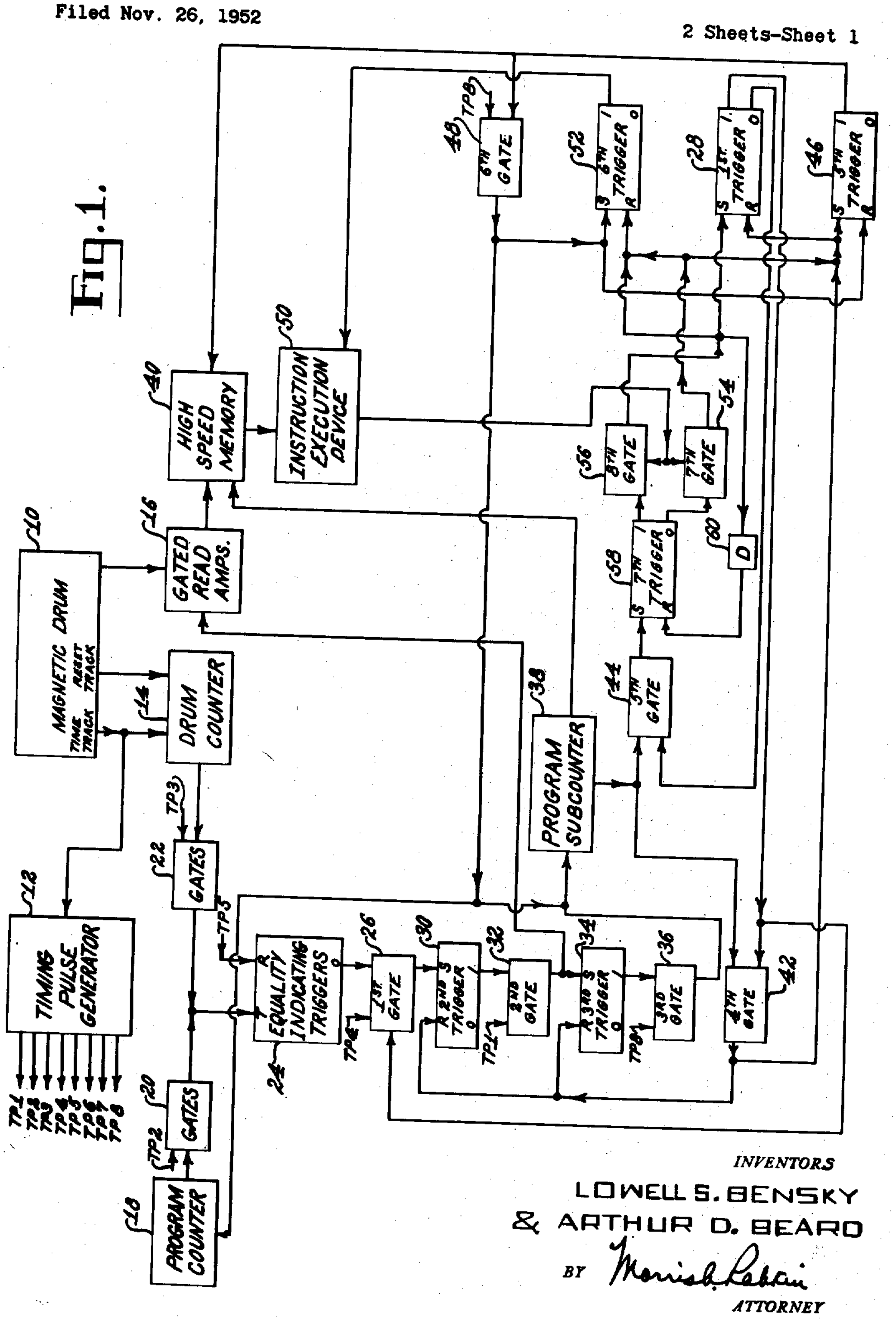

This invention relates to electronic computing systems, and more particularly to an improved system for reading from a storage device instructions for execution by a computing system.

In the design of a digital computer, provision for programming the computer, or establishing the operations to be performed, is made by establishing a set of routines or groups of instructions which the computer must follow for each operation. These routines or groups of instructions are usually established in a section of a computer known as the programming section and each instruction group is called up in order to direct the computer to carry out its more important functions. As an illustration, the programming of an addition calls for a number of instructions. The first instruction may be to enter a first number to be added into the adder circuitry of the computer. The second instruction requires the entry of a second number into the adder circuit. A third instruction tells the adder to add the two numbers and the fourth instruction tells the adder to transfer its sum to the portion of the computer where such sum is required. A fifth instruction tells the adder to clear itself in order to be ready for the next required addition. This sequence of actions in the more modern computers may be established either by a plugboard, or a wiring matrix, which is actuated in response to a single instruction, which instruction may be recorded on a cyclic operating device such as a magnetic drum. The magnetic drum may be found described in the literature and more specifically comprises a cylindrical surface upon which is placed a magnetic coating. The drum is rotated at high speed, and by means of magnetic recording heads placed transversely across the surface of the drum, binary coded information in the form of positive and negative pulses, or the absence or presence of pulses, may be magnetically recorded on the drum surface. Usually, each one of the magnetic read-write heads controls what is known as a channel. This is the track on the drum surface which passes under and is controlled by a particular read-write head. A description of a magnetic drum of the type intended may be found in "High Speed Computing Devices," by Engineering Research Associates, pp. 322–339.

It will be appreciated that a large information handling machine which performs a number of diverse operations does have need for storing large quantities of instructions. Instructions usually comprise a group of words. These words may be defined as an ordered set of characters having a meaning and considered as a unit. Digital computers commonly use a fixed or standard word-length, that is, a fixed number of characters per word. Storage of words on a magnetic drum is cheap, but when it is desired to employ a non-fixed or non-standard word-length, the access time to desired information on a drum becomes rather lengthy. A high speed storage, such as an electrostatic storage tube, does permit rapid access to information stored therein, but the cost of storage for each binary digit is expensive. In computers employing standard word-lengths, the recording surface of the drum which is required is usually standard, and thus the data recorded on the drum and the drum rotation can be planned in advance to present the required data at the proper time. This is not possible with non-standard word-lengths, and thus time is wasted waiting for a required group of instructions to appear.

The use of a cyclic device such as a magnetic drum entails a time delay in the obtention of information therefrom, in view of the fact that a desired instruction may not always be passing under a head and thus available for read-out at the time it is required. The delay time is the time required until a desired instruction appears under the magnetic read-write heads. Various expedients may be used to cut down this delay. A plurality of read-write heads may be placed around the magnetic drum so that the instruction takes much less time to pass under the nearest one of the heads. Another expedient is to record instructions on a magnetic tape in a sequence so that a number of instructions may be read out at once, recorded on a drum and repeted continuously. The computer then looks for and carries out each of these drum recorded instructions before looking for the next set in the programming sequence on the magnetic tape.

It is therefore an object of this invention to provide a system for issuing instructions to a computer as they are required.

A further object of this invention is to reduce the effective access time required for obtaining instructions from a magnetic drum.

Still a further object of this invention is to combine the advantages of inexpensive magnetic drum storage with that of a high sped storage device for providing instructions to a computer when required.

These and further objects of the invention are achieved in a computer wherein a magnetic drum is used to store a plurality of instructions or data, and a high speed asynchronously operable memory is used as a surge tank type of storage device. In the present system a desired group of instructions, which can be of non-standard word-length, are surged from a magnetic drum into a high speed memory. The address, or storage location, for each one of these instructions in the high speed memory, is provided at the time each instruction is being read out of the drum. When the group of instructions has been completely surged from the drum, the high speed memory receives an order to transfer each one of the instructions into the part of the computer that executes these instructions. For purposes of reference, this is hereinafter called an instruction execution device. The address for each one of the instructions being read out is again provided. Each subsequent instruction is read out of the high speed memory in response to a signal from the instruction execution device which occurs when the previous instruction has been carried out. After all the instructions have been carried out, the apparatus is established in condition to receive another desired group of instructions.

Figure 2:
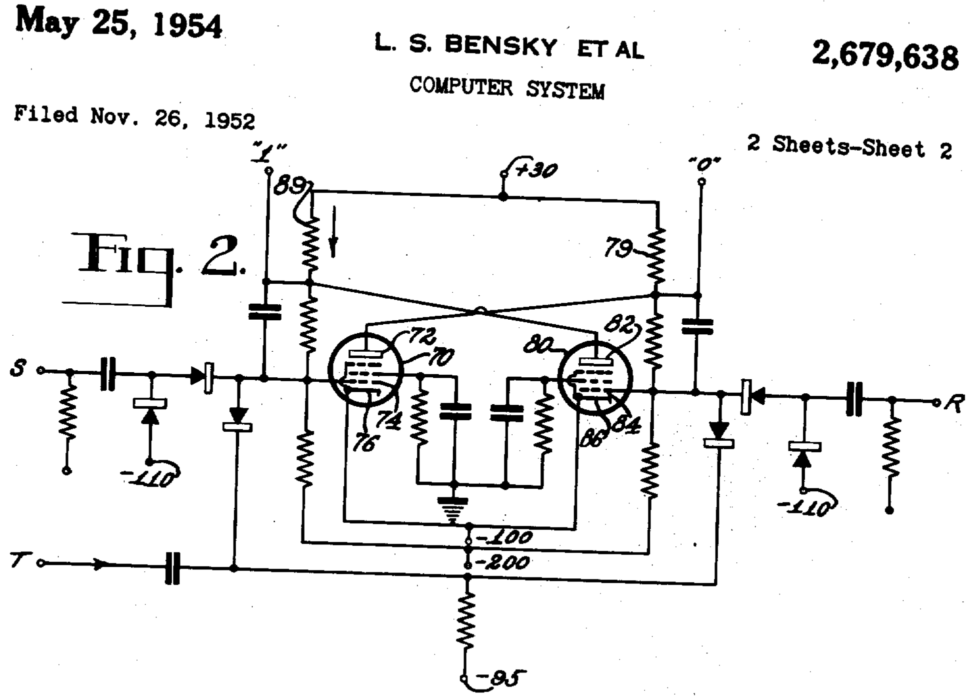
Figure 3:
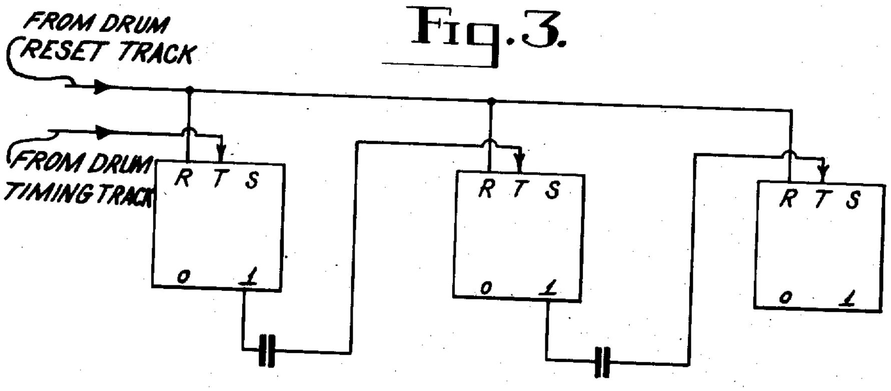
Figure 4:
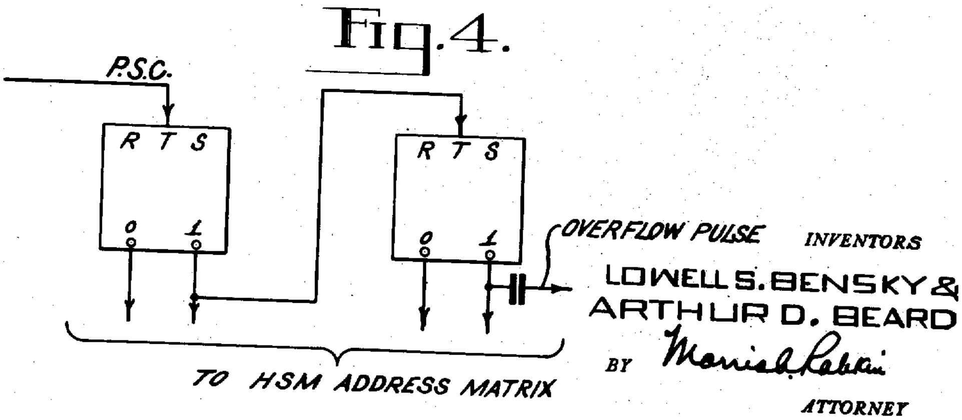

The novel features of the invention, as well as the invention itself, both as to its organization and method of operation, will best be understood from the following description when taken in connection with the drawings, wherein Figure 1 is a schematic diagram of an embodiment of the invention showing a program instruction reading system, Figure 2 is a circuit diagram of a trigger circuit which may be employed in the system, Figure 3 is a schematic diagram of a type of counter which may be used in the system, and Figure 4 shows a schematic diagram of a program sub-counter which is employed within the system.

Referring now to Figure 1, there may be seen a schematic diagram of a system which is an embodiment of the present invention for providing instructions or data to a computer when required. As previously indicated, a magnetic drum 10 has data or instructions recorded thereon in a coded form. The instructions are recorded in a manner which permits identification of each group of instructions. This may be by special coding so that each group is identified with its code or by recording by lines and numbering each line; or, as is preferred, having an identifiable starting point from which lines may be counted. Accordingly, a track on the periphery of the drum has recorded thereon pulses, one for each line of instruction. These are known as timing track pulses. If one of the instructions and its associated time pulse is designated as the first, any instruction may be located by its number by counting the timing pulses after the first as the drum rotates. When the number of the instruction desired appears, the instruction may be read out. An example of a system, which is suitable, wherein a timing track on a drum is employed, is shown and described in Patent No. 2,540,654 to A. A. Cohen et al., and is entitled "Data Storage System."

The recorded timing track (not shown) is also used to provide pulses to actuate a timing pulse generator 12. This timing pulse generator divides the interval between each one of the timing track pulses into eight parts. The output of the timing pulse generator consists of eight pulses, the first of which occurs synchronously with the timing track pulse and the eighth of which occurs just before the next timing track pulse passes under the magnetic reading head. A tapped delay line having the required number of taps and having the timing track pulses applied to its input is suitable as a timing pulse generator. Another suitable system for generating eight spaced pulses is to use a series of univibrators, the first of which is driven by the timing pulse. For the purpose of maintaining simplicity and clarity in the drawing, the outputs of the timing pulse generator are shown as eight arrows pointing away from the generator with the number of the timing pulse position at the arrowhead. Application of a timing pulse to any of the apparatus is shown as an arrow terminating at the representative rectangle and having the timing pulse number positioned at the tail of the arrow.

The timing track pulses are read out by a magnetic reading head into a counter 14 which continuously counts each one of the pulses. This counter is known hereafter as a drum counter. The drum counter 14 is reset to zero by a reset track which has a pulse recorded thereon and provides a pulse output which serves as a reset pulse for the drum counter so that the drum counter may start its count anew on the next drum cycle.

Across the periphery of the drum are reading heads (not shown), whose output is applied to a plurality of gated read amplifiers 16. The source of a signal for activating or gating these gated read amplifiers will be subsequently described. Another counter is provided and is known as the program counter 18. This program counter is the one in which the number of the line on the drum of the first of a desired group of instructions is entered. The program counter and the drum counter each has its count output respectively applied to an associated group of gates 20, 22. These groups of gates are opened alternately by timing pulses designated as T. P. 2 and T. P. 3. The output from each group of gates is accordingly alternately applied to a plurality of trigger circuits 24 designated as equality indicating triggers.

In operation, the program counter, 18, has its output applied to the first group of gates 20, to prime different ones of these gates in accordance with its count output so that, when a timing pulse, which is timing pulse 2, is applied thereto from the timing pulse generator, these gates transfer the program counter count into the plurality of trigger circuits 24 which are designated as equality indicating triggers. Timing pulse 2 terminates, thus closing the first group of gates Upon the occurrence of timing pulse 3, the grou of gates 22, associated with the drum counter 14 and which are primed in accordance with th count represented by the drum counter output act to apply this count to the equality indicatin triggers; but the connections are made in a man ner to reset those of the equality indicating trig gers expressive of this count. Thereby, if the pro gram counter and drum counter numbers ar identical, the equality indicating triggers are re set to their initial or zero condition. If they ar not identical, timing pulse 5 resets the equalit trigger indicators so that when the drum cour ter counts the next timing track pulse, the con parison may be made anew. A system of this so is assigned to the present assignee and is con pletely shown, described, and claimed in applic tion Serial No. 296,056, filed June 27, 1952

Lowell S. Bensky and Linder C. Hobbs, for "Electronic Comparator Device." In this system, each equality trigger indicator circuit has one of its output terminals, designated as a zero terminal, connected to an "and" or "coincidence" gate. All of the gates are connected to a single output "and" gate. This output "and" gate provides an output pulse only upon receiving signals from the preceding gates which occur (1) only if all the equality triggers are reset to zero, and (2) upon receiving the proper timing pulse. For simplicity, the output from the zero terminal of the rectangle representing all the equality trigger indicators is shown being applied directly to a first gate 26 which represents the single output "and" gate. This gate requires, in addition to time pulse 4, an additional signal before it is opened to pass a signal. The additional signal is a signal from the "one" terminal of a first trigger circuit 28, on the right side of the drawing, which is initially set, in a manner to be hereafter described, when a requirement for instructions is established. This second trigger circuit provides what can be termed a "refill" signal. Accordingly, when timing pulse 4, an equality output from the equality triggers, and a "one" terminal output or refill signal from the first trigger circuit 28 are applied to the first gate 26, a pulse will be transmitted to the set terminal of a following second trigger circuit 30.

It is to be noted that each trigger circuit, represented by a rectangle, is a bistable trigger circuit having two output terminals designated as "1" and "0" and three input terminals designated as S (set), R (reset) and T (trigger). Application of a signal to the S terminal establishes the trigger circuit with its "1" output terminal high and its "0" output terminal low. Application of a signal to the R terminal reverses this condition. Application of a signal to the T terminal transfers the trigger circuit from whatever its condition at the time to the opposite condition. The first gate 26 applies an output pulse to the set terminal of the second trigger circuit 30. This second trigger circuit accordingly has its output terminal, designated as "one," made high, and the output terminal designated as "zero" made low.

The output from the "one" terminal of the second trigger circuit is a D. C. level which primes a second gate 32. The primed second gate 32, upon the arrival of a first timing pulse applies a pulse to the set terminal of a third trigger circuit 34. The output of the second gate is also applied to open the gated "read" amplifiers 16 so that they may commence read-out of the desired group of instructions which are now coming under the read-write heads on the magnetic drum.

The third trigger circuit 34 has its "one" output terminal made high when the output from the second gate is applied to its set terminal. This "one" terminal output, which is a D. C. level, is applied to prime a third gate 36. When an eighth timing pulse also arrives, the third gate applies an output pulse to drive a program sub-counter 38. This program sub-counter may comprise a binary counter, such as a chain of bistable trigger circuits, which counts each pulse coming out of the third gate 36. Since, with this type of counter the condition of the trigger circuits changes for each count, by taking an output from each trigger circuit in the counter there is provided a parallel set of signals which (1) is an indication of the count, and (2) may be used as a binary coded expression to represent the location or address where the instruction which is being read from the magnetic drum just after making this count is to be stored. This address information is applied to a high speed memory 40 into which the gated read amplifiers 16 are transferring the instructions being read from the drum. As previously indicated, the intervals between each line of instructions are divided into eight intervals with a first timing pulse occurring simultaneously with each recorded line on the drum and an eighth timing pulse just before the next recorded line. Consequently, as long as the third trigger circuit 34 primes the third gate 36, each eighth timing pulse will cause the gate to emit an output pulse which advances the program subcounter one count. Since this occurs just prior to the read out of the next line of data, the high speed memory has the address for the next line of data applied to it when the next line of data is read out.

Any operable high speed random access memory systems may be used in conjunction with the magnetic drum.

A description of a suitable high speed memory adapted to store instructions using address information in binary coded form will be found in "High Speed Computing Devices" by Engineering Research Associates, on pages 370–374. The memory tube described therein may also be found described in detail in applications Serial No. 118,758, now Patent No. 2,635,201, filed September 30, 1949, entitled "Electron Discharge Device," and Serial No. 130,411, now Patent No. 2,645,712, filed December 1, 1949, by, respectively, J. A. Rajchman and J. A. Rajchman, M. H. Mesner and M. Rosenberg, and assigned to this assignee. A system for utilizing digital signals of the type provided by the program subcounter, to address storage in the tube, is described in application Serial No. 130,412, filed December 1, 1949, by J. A. Rajchman, M. H. Mesner and M. Rosenberg, entitled "Bias Generating Matrix," and assigned to this assignee. The memory tube described has a primary source of electrons enclosed between two selecting grids, which in turn are enclosed by two storage targets. The selecting grids consist of two sets of parallel separately insulated wires, one set being at right angles to the other. Thereby, openings or windows through the grids are formed which are defined by two adjacent parallel grid wires in one direction and two adjacent parallel grid wires at right angles thereto. Control of the flow of electrons through any desired rectangular opening, provided by the selecting grid wires, may be had by properly biasing the wires defining an opening. Binary coded information may be stored by the storage target or read from the target. Storage of data or instructions consisting of a plurality of binary digits may require, for parallel storage, the use of a plurality of these tubes operating in parallel wherein each binary digit of data is simultaneously stored, in each of the tubes, at the same location. Details of the operations of this tube will be found in the aforementioned applications and article.

The program sub-counter is a cyclic device and after it has reached its maximum count will return to zero. The maximum count is established by the number of instructions in a group which it is desired to read out. It should be noted that as long as the third trigger circuit 34 keeps the third gate 36 primed, every time an eighth timing pulse occurs, the third gate will provide an impulse to advance the count in the program subcounter 38. In view of the timing, such count is advanced just before the next instruction appears on the drum, and accordingly this next instruction is read into the high speed memory at the location or address provided by the program sub-counter.

When all of a desired group of instructions or data have been read from the drum, the occurrence of the next eighth timing pulse causes the program sub-counter to be recycled to its starting condition. An overflow pulse is derived from the last stage of the sub-counter as it is driven from its maximum to its zero count condition. This overflow pulse is applied to prime two gates 42, 44. One is a fourth gate 42, which in addition to the overflow pulse requires an output from the "one" terminal of the first trigger circuit 28 before it will pass a signal. The other is a fifth gate 44 which in addition to the overflow pulse, requires a refill signal from the "zero" output terminal of the first trigger circuit before it can transmit an impulse. Since the required fourth gate inputs are present, the fourth gate applies an output impulse to the reset terminals of the second and third trigger circuits 30, 34 and also to the reset terminal of the first trigger circuit 28. This impulse is also applied to the set terminal of a fifth trigger circuit 46, so that the "one" output terminal of the fifth trigger circuit is made high. Accordingly, the effect of the overflow pulse is to close, for further reading, the gated read amplifier 16, and to close the third gate 36 to pass further counting impulses.

The fifth trigger circuit 46 has its "one" output terminal connected to supply a "read out" signal to the high speed memory 40 to signal it to read out the first instruction. The address for the instruction being read out is provided by the program sub-counter which has been recycled to zero, which is the address of the first instruction read out from the magnetic drum and into the high speed memory. Apparatus for addressing read into or read out from a memory tube of the type previously indicated in response to a signal and address information will be found described and claimed in applications Serial Nos. 130,411 and 130,412 as identified previously.

The "one" terminal output of the fifth trigger circuit 46 is also applied to a sixth gate 48. This gate has applied thereto eighth timing pulses. It is to be noted that the high speed memory reads the first instruction out to an "instruction execution device." By an "instruction execution device" is meant the subsequent control apparatus which utilizes or follows the instructions or data which have been set down on the magnetic drum. As a simple illustration, this apparatus may be a register and the first instruction may be applied through decoding gates to provide a reset pulse to clear this register for the receipt of information. In being cleared, the instruction execution device supplies an output indication that the instruction has been completed.

The sixth gating circuit 48, to which the fifth trigger circuit "one" output and eighth ones of the timing pulses are applied, provides an output upon the concurrence of its inputs. This output is applied (1) to the set terminal of a sixth trigger circuit 52 to set it with its one terminal output high, (2) to the program subcounter input to advance one count the count of the program subcounter, (3) to the reset terminal of the fifth trigger circuit 46 to reset it with its one output terminal low and its zero output terminal high, (4) to the program counter 18 to advance it one count. This occurs every time an eighth timing pulse, in conjunction with the output from the one terminal of the fifth trigger circuit, are applied to the sixth gate input. The operation which occurs is summarized as follows:

The program sub-counter provides an address for the location of an instruction which is to be read out of the high speed memory into the instruction execution device. This occurs pursuant to a read-out signal from the fifth trigger circuit. Upon the occurrence of an eighth timing pulse subsequent to such read out, the fifth trigger circuit is reset and the sixth trigger circuit is set in condition to provide an "execute instruction" signal to the instruction execution device to carry out the instruction read into it. The count of both the program sub-counter and the program counter is advanced one count.

At the completion of the routines indicated by the instruction, a pulse is provided, indicative of that fact. This "instruction complete" signal is applied to one input of a seventh gate 54 and an eighth gate 56. The seventh and eighth gates have their other inputs respectively connected to the "zero" and "one" terminals of a seventh trigger circuit 58. The seventh trigger circuit is positioned at this time with its "zero" output terminal high by a mechanism which is explained hereafter. This enables the seventh gate to pass a pulse upon receipt of the "instruction complete" signal. The output of the seventh gate 54 is applied (1) to the reset terminal of the sixth trigger circuit and (2) to the set terminal of the fifth trigger circuit, which reestablishes the conditions whereby the high speed memory is signaled to read out the next instruction, the address of which has been previously established in the program sub-counter.

This cycle of operation continues, the high speed memory providing data or an instruction only after the instruction execution device provides a signal that the instruction has been executed. This is an asynchronous operation, since no instruction is provided unless and until the previous one is executed. Such instruction provision can occur, as rapidly or as slowly as is required by the system.

The overflow signal, which is provided by the program sub-counter in response to the output from the sixth gate as a result of the eighth timing pulse just preceding the read out from the high speed memory of the last instruction, is applied to the fifth gate 44. This gate has also been primed by an output from the "zero" terminal of the first trigger circuit 28. The fifth gate accordingly applies an output pulse to the set terminal of the seventh trigger circuit 58. The seventh trigger circuit has its "one" terminal output applied to the eighth gate 56. Upon the completion of the execution of the last instruction which was stored in the high speed memory, the last "instruction complete" signal is applied through the now opened eighth gate to the set terminal of the first trigger circuit 28 which makes its "one" output terminal high, thus providing a "refill" signal. The eighth gate output is also applied to the reset terminal of the sixth trigger circuit which is reset thereby, thus removing the "execute" signal. The eighth gate output is also fed through a delay network 60 back to the reset terminal of the seventh trigger circuit whereby this trigger circuit is reset. A delay is required to insure that the sixth trigger circuit is reset and the first trigger circuit is set prior to the seventh trigger circuit being reset. The program counter is now in condition to call up the next group of instructions out of the magnetic drum. Re-establishment of the first trigger c cuit with its one terminal high also permits, upon the equality indicating triggers 24 showing that the program counter has the same number as the drum counter, the read-out of the next group of instructions from the magnetic drum.

Consideration of the system described above shows that the instructions on the magnetic drum are surged out and are then provided to the computer upon demand. This permits operation with non-standard word-lengths with a minimum of delay. The access time to the magnetic drum instructions is considerably reduced by a factor determined by the number of instructions surged out at any one time. The waiting period involved is merely the time required by the first instruction of a desired group to arrive under the magnetic read heads. It should be noted, at this time, that neither the high speed memory nor the instruction execution or control device are being claimed here as part of the invention. The inventive concept here is confined to a system whereby a reservoir of information or data is established to be provided upon demand to the apparatus which can use this information. This permits utilization with "non-standard" word-lengths. All that is required from the utility apparatus is a signal to read out upon the completion of the operation called for by the information supplied.

One illustration of a suitable instruction execution device is found in the computer commonly known as the "Eniac." This is described by Arthur W. Burks in the Proceedings of the I. R. E. of August, 1947.

A description of its program control circuit which is found on page 764 of this publication indicates apparatus which receives an initiating pulse to commence operations, provides for the type of operation to be performed by means of an instruction, and provides an output pulse upon completion of the operation.

It should be noted that the actual program of instructions carried out by the Eniac is established by manually setting up switches. Since with the computer of the type contemplated herein these instructions are coded electrically and stored on the magnetic drum, the switches are replaceable by flip-flops or other devices which can be used for decoding the instructions so that they can be carried out by the instruction execution portion of the computer.

A further and more complete description of the computer known as the "Eniac" may be found in "Report on the Eniac, Technical Report I," by the University of Pennsylvania staff of the Moore School of Electrical Engineering.

Another type of suitable high speed memory may be found described in an article by Williams and Kilburn entitled "A Storage System for Use with Binary Digital Computing Machines," in Proceedings of the Institution of Engineers, part III, pp. 81-100, March, 1949.

It is not deemed necessary to go into a detailed description of how a high speed memory, of the types cited as being suitable, operates to read in, store, or read out the coded instructions as described above. Neither is it deemed necessary to go into a detailed description of how an instruction execution device, of the type cited as being suitable, operates to execute an instruction and provide a signal indicative of the completion thereof. Such explanations would unduly extend and complicate the record. It is believed that these systems are well known to those skilled in the computer art, are thoroughly described in the literature cited, and their combination with the present system in the manner described herein is well within ability of one skilled in this art.

The trigger circuits, of the type which are utilized in the subject embodiment of the invention, are commonly known in the art, having two stable conditions and providing an output for each one of the conditions. A typical circuit is shown in Fig. 2. The set input terminal (designated as S) is connected through a condenser and rectifier to the grid 74 of one of the two tubes 70, 80 used in the trigger circuit an, when a positive pulse is applied to this input terminal, it will cause conduction in that trigger circuit tube 70 to the grid 74 of which it is coupled. A reset input terminal (designated as R) is coupled through a condenser and rectifier to the grid 84 of the other tube 80 of the trigger circuit pair. A pulse applied to the reset terminal will cause the tube 80 connected thereto to conduct, thereby cutting off the conduction of the other tube.

The anode 72 of the tube 70 connected to the set terminal is connected to a plate load resistor 79 and to an output terminal designated as the "zero" output terminal. The anode 82 of the tube 80 whose grid is connected to the reset terminal is connected to an anode load resistor 89 and to an output terminal which is designated as the "one" output terminal. The anodes of both tubes are cross-connected to the grids of the other tube, in well-known fashion, through coupling resistors and condensers. Accordingly, a pulse applied to the set terminal will, by virtue of causing the tube connected thereto to become conducting, place a high potential on the one terminal and a low potential on the zero terminal. The reverse condition arises when a pulse is applied to the reset terminal. A negative pulse applied to the terminal designated as "T" (standing for trigger), has the effect of interchanging the conduction of the trigger circuit tubes. This arises by virtue of the fact that the negative pulse is applied to the grids of both tubes. The tube which is cut off will remain in that condition, the tube which is conducting is driven to cut-off. A rise in potential of the anode of this latter tube is transferred to the grid of the former tube to drive it into conduction, whereby the previous condition of the tubes is interchanged. A detailed description of trigger circuits of this general type may be found in chapter 10 of "Theory and Applications of Vacuum Tubes," by Reich, published by the McGraw-Hill Book Company.

A drum counter 14 of the type represented by a rectangle in Fig. 1 may be made of several trigger circuit stages which are connected cascade. As an illustration, Fig. 3 is a schematic diagram of three trigger circuit stages connected in such a cascade to form a drum counter. Three trigger circuits of the type shown in Figure 2 are required. It is believed that the connection of three Figure 2's to make a Figure 3 will be readily understood from the drawings.

The drum counter consists of three trigger circuits, by way of example, having their "one" output terminals connected to the succeeding "trigger" input terminals. Pulses from the drum timing track are picked up by a magnetic reading head, shaped and amplified and then applied to the "trigger" terminal of the first trigger circuit. When each trigger circuit changes from the condition wherein the "one" terminal is high to the one where it becomes low, a negative pulse is transmitted to the succeeding trigger circuit. A reset pulse is applied from the reset track of the magnetic drum to all the reset terminals of the trigger circuits to reset them to their zero condition.

A program counter can consist of the identical circuit except that the number of the first of a desired group of instructions is established in the counter by applying binary signals representative of the number or code of the first desired instruction of a group to all the "set" terminals of the counter.

Figure 4 is a schematic diagram of a program sub-counter. Only two trigger circuits are shown, by way of example, to provide for a count of four. As previously described for the drum counter, input pulses are applied to the "trigger" input terminal of the first trigger circuit. The "one" terminal of the first trigger circuit is connected to the "trigger" terminal of the second trigger circuit. The "one" terminal of the second trigger circuit is the one from which an overflow pulse is taken, since, at the count of four the counter will complete a cycle and the trigger circuits are reset in their zero conditions again.

Address outputs are taken from the zero and one terminals of each of the trigger circuits. Thus each count provides a unique pattern of voltages which are applied, for biasing purposes to the analogue conversion equipment required, with the types of high speed memories which may be used herewith to be converted into voltages which locate the write-in or read-out of information being stored.

The type of gates represented by a rectangle in Fig. 1 may be any suitable type which is well known in the art. One example of a suitable type of gate will be found in the Proceedings of the I. R. E. for May, 1950. On page 511 will be found an article by Tung Chang Chen entitled "Diode Coincidence and Mixing Circuits in Digital Computers." This shows a circuit whereby two inputs existing coincidentally are required in order to provide an output. This system may also be expanded to include as many other inputs for a single output as are required with the limitation that as the number of parallel inputs increases, the speed of operation of the apparatus decreases. Another type of suitable coincidence circuit is the gating circuit tube requiring the application of signals simultaneously to the various control grids of a single multigrid tube in order to make it conduct. A description of this may be found in the previously indicated article on the electronic computing circuits of the Eniac, wherein it is called an "and" operation.

The delay circuit represented by a rectangle in Figure 1 may be any resistor-condenser network which provides the requisite time delay, or a slideback multivibrator of the type described by O. S. Puckle on page 50 in "Time Bases" published by John Wiley and Sons. This circuit operates to provide an output pulse which is delayed from an input pulse, by the time determined by the circuit components selected.

There has been described herein a novel, useful and rapid system whereby programming instructions may be provided upon demand for a computer, whereby the access time for obtaining these instructions is reduced.

What is claimed is:

1. A system for surging into a high speed storage, for demand use by an instruction execution device, a desired group of instructions, out of a cyclically operating storage device wherein the instructions are stored as lines, each line having associated therewith a counting pulse, said system comprising means to establish the count of the first line of said desired group of instructions, means to count said associated counting pulses on said cyclically operating storage device, means to compare the count of said associated counting pulses with the count of said desired group established in said establishing means, means responsive to the occurrence of a coincidence in said counts to permit transfer of the lines of data corresponding to said desired group of instructions into said high speed storage and instruction execution device, means to establish the location of each of said group of instructions in said high speed storage and the sequence of read out into said instruction execution device of said instructions from said high speed storage, and means responsive to the execution of an instruction by said instruction execution device to actuate said high speed memory to provide the next one of said desired group of instructions required.

2. A system for surging into a high speed storage, for demand use by an instruction execution device, desired data groups out of a cyclically operating storage device wherein the data are stored in groups, each group being identifiable, said system comprising means to identify on said cyclically operating storage device a desired data group, means responsive to said identifying means to read the data in said group in sequence into said high speed storage, means to address the position of said data group in said high speed storage and to address the read out sequence of said data to said instruction execution device, means responsive to the reading out of said data to control said last named means to address the next instruction to be executed, and means responsive to the execution of an instruction by said instruction execution device to call out of said high speed memory the next of said data which is required.

3. A system for surging a group of instructions out of a cyclically operating storage device wherein the instructions are stored and are identifiable, into a high speed storage for demand use by an instruction execution device, said system comprising means to locate on said cyclically operating storage device a desired group of instructions, means responsive to said locating means to read the instructions in said group in sequence into said high speed storage, means to provide an address for each instruction being read into and out from said high speed memory for execution, and means responsive to the completion of the read out of all of said group of instructions from said cyclically operating device to call out the first instruction for execution from said high speed memory and responsive to the execution of an instruction to call out from said high speed memory into said instruction execution device the next instruction to be executed.

4. A system for reading, by a read out device, a group of instructions which are stored as lines of data on a cyclically operating storage device, into a high speed memory for demand use by an instruction execution device, said system comprising means for recognizing the first of a desired group of instructions on said cyclically operating storage device, means to establish a first signal indicative of a requirement for instructions, means to generate a timing pulse occurring in each of the intervals between passage of lines of instruction by said read out device, means responsive to said instruction group recognizing means and said first signal to permit the read out of said desired group of instructions into said high speed memory, cyclic means to provide address information to said high speed memory for each instruction in turn in said desired group responsive to activation of said means to permit read out and said timing pulses, means to generate a first overflow pulse responsive to completion of a cycle by said cyclic means, means to apply said first overflow pulse to (1) inactivate said read out means, (2) to inactivate said means to establish a first signal, and (3) to a means to establish a second signal responsive thereto representative of an order to read out an instruction from said high speed memory, said cyclic means providing the address of the instruction being read out, means to generate advancing pulses responsive to said second signal and to certain ones of said timing pulses, means to apply the first of said advancing pulses (1) to said cyclic means to advance said cyclic means to provide the address of an instruction being read out of said high speed memory, (2) to inactivate said means to generate said second signal, and (3) to a means to generate a third signal responsive thereto representative of an execute instruction order to said instruction execution device, means responsive to the execution of an instruction by said device to inactivate said means to generate a third signal and to activate said means to generate a second signal, whereby said cyclic means provides the address of the next instruction to be read out of said high speed memory into said instruction execution device, said cycle of instruction read out and instruction execution being continued until said cyclic means generates a second overflow pulse responsive to a completion of a cycle, and means responsive to said second overflow pulse and the execution of an instruction by said instruction execution device to inactivate said third signal generating means and to activate said first signal generating means.

5. A system for surging a desired group of instructions out of a cyclically operating storage device having a plurality of successively stored instructions into apparatus for storing and on demand for successively executing said instructions, said system comprising means to establish an instruction requirement indicating signal, means to identify the first of said desired group of instructions, means responsive to said requirement signal and identification by said last named means to permit read out of the instructions in said group, cyclic means to count and provide an address for each instruction being read out of said cyclically operating storage device into said storing apparatus, means to inactivate said requirement signal establishing means responsive to an overflow output by said cyclic means after addressing the last instruction of said group, means responsive to said overflow output to establish a signal to initiate a read out of an instruction addressed by said cyclic means to said execution device, means to generate a pulse responsive to said read out signal and delayed from the establishment of said signal, means to apply said pulse to advance the count and address of said cyclic means and to inactivate said read out signal establishing means, means responsive to said pulse to generate a signal to initiate execution of the instruction read into said instruction execution device, means responsive to execution of said instruction to inactivate said means to generate a signal to initiate execution and to activate said means to generate a read out signal, and means responsive to a second overflow pulse from said cyclic means and from said means responsive to instruction execution to inactivate said means to generate a read out signal and said means to generate a signal to initiate execution and to activate said instruction requirement signal generating means.

6. A system for reading by a reading device a group of instructions stored as lines on a cyclically operating storage device into a high speed memory for demand use by an instruction execution device, said system comprising a plurality of bistable trigger circuits each of which has a set and reset stable position, a plurality of gate circuits of the type requiring two inputs to provide an output, means to generate timing pulses the first of which occurs as a line of instructions passes said reading device and the last of which occurs prior to the next line of instructions passing said reading device, means to establish a first of said trigger circuits in a reset position, means to a recognize the first line of a desired group of instructions, means to permit read out of said desired group of instructions into said high speed memory responsive to said recognizing means and output from said first trigger circuit in set position, means to establish in set position a second of said plurality of trigger circuits responsive to output from said means to permit read out, cyclic counter means to successively provide address information to said high speed memory for each line of instructions, a first of said plurality of gates, means to apply output from said second trigger circuit in set position and said last ones of said timing pulses to a first of said plurality of gates to derive an output therefrom, means to apply said first gate output to said cyclic counter means to successively advance address information for each line of instructions, means to derive a first overflow pulse from said cyclic counter means upon completion of a first cycle of advancing address information, means to apply said overflow pulse and the reset output from said first trigger circuit to a second of said gate circuits to obtain an output therefrom, a third of said plurality of trigger circuits, means to apply said second gate circuit output to said first, second and third trigger circuits to drive said first and second trigger circuits to a reset condition and said third trigger circuit to a set condition, means to apply said third trigger circuit set output (1) to said high speed memory to signal read out the desired group of instructions in accordance with the address established by said cyclic means, and (2) to a third of said gate circuits, means to apply said last ones of said timing pulse to said third gate circuit to derive an output therefrom in the presence of set output from said third trigger circuit, means to apply said third gate output (1) to said cyclic means to advance the address information for each line of instructions being read out, (2) to drive said third trigger circuit to a reset condition, means to apply said set output of said fourth trigger circuit to said instruction execution device to initiate execution of the first instruction read out from said high speed memory, means responsive to an execution of an instruction to drive said third trigger circuit to a set condition and said fourth trigger circuit to a reset condition, and means responsive to a second overflow pulse from said cyclic means and execution of the last of said group of instructions to drive said third and fourth trigger circuits to reset position and to drive said second trigger circuit to a set position.

7. A system for surging into a high speed memory and on demand into an instruction execution device a desired group of instructions stored on a cyclically operating magnetic storage device whereon said instructions are recorded as lines of instructions, said lines successively passing under a reading head, said system comprising means to generate a first timing pulse synchronously as a line instruction passes under a reading head and a second timing pulse prior to the succeeding line of instructions passing under said reading head, a plurality of bistable state trigger circuits each being of the type having a first input terminal to which application of a pulse drives the trigger circuit to a first condition of stability providing output at a first output terminal and a second input terminal to which application of a pulse drives the trigger circuit to a second condition of stability providing output at a second output terminal, a plurality of gate circuits of the type requiring two simultaneous inputs to provide an output pulse, means to establish a first of said trigger circuits in a first condition of stability, means to identify the first line of a desired group of instructions passing under said reading head, means to establish a second of said trigger circuits in a first condition of stability responsive to said identifying means and a first output from said first trigger circuit, means to apply output from said second trigger circuit first output terminal and a first timing pulse to the input of a first of said gates, means to apply output from said first gate to the first input terminal of a third trigger circuit, means to permit read out from said cyclically operating device into said high speed memory responsive to output from said first gate, means to apply output from said third trigger circuit output terminal and to apply said second timing pulses to the inputs of a second of said gating circuits, cyclic counting means to count input pulses to provide outputs consisting of a count indication and an overflow pulse upon completion of a cycle of counting, means to apply output from said second gating circuit to said cyclic counting means, means to apply the count indication output from said cyclic counting means to said high speed memory as an address for each line of instructions being entered therein, means to apply as inputs to a third of said gate circuits an overflow output pulse from said cyclic means and a first output from said first trigger circuit, means to apply the output from said third gate circuit to the second inputs of said first, second and third trigger circuits and to the first input terminal of a fourth of said trigger circuits, means to apply the output from the first output terminal of said fourth trigger circuit to said high speed memory to read into said executing device the instruction whose address is indicated by said cyclic counting means, means to apply output from said fourth trigger circuit first output terminal and second ones of said timing pulses to a fourth of said gating circuits, means to apply the output of said fourth gating circuit (1) to said cyclic counting means to advance its count (2) to the second input of said fourth trigger circuit and, (3) to the first input of a fifth of said trigger circuits, means to apply output from the first output terminal of said fifth trigger circuit to said execution device to initiate execution of the instruction read therein from said high speed memory, means to generate a signal upon execution of said instruction by said instruction device, means to apply said instruction complete signal to the first input terminal of said fourth trigger circuit and to the second input terminal of said fifth trigger circuit whereby the next instruction is read out of the high speed memory into said execution device, and means to apply an overflow output from said cyclic means and an execution complete signal to the second input terminals of said fourth and fifth trigger circuits and to the first input terminal of said first trigger circuit to reestablish initial surging conditions.

References Cited in the file of this patent

UNITED STATES PATENTS

| Number | Name | Date |
|---|---|---|
| 2,246,449 | Marshall et al. | June 17, 1941 |
| 2,288,645 | Quinby | July 7, 1942 |
| 2,386,743 | May et al. | Oct. 9, 1946 |
| 2,410,540 | Wight et al. | Nov. 5, 1946 |
| 2,611,813 | Sharpless et al. | Sept. 23, 1952 |
| 2,614,169 | Cohen et al. | Oct. 14, 1952 |